United States Patent
Brar et al.

(10) Patent No.: US 7,920,542 B1
(45) Date of Patent: Apr. 5, 2011

(54) METHOD AND APPARATUS FOR PROVIDING SECURE VOICE/MULTIMEDIA COMMUNICATIONS OVER INTERNET PROTOCOL

(75) Inventors: Harbir S. Brar, Monroe Township, Middlesex County, NJ (US); Koan S. Chong, East Brunswick, NJ (US); Kevin B. Kealy, Benson, AZ (US); William T. Marshall, Chatham, NJ (US); Israel Rosencrantz, Boulder, CO (US); Rachel Rosencrantz, Boulder, CO (US); Chaim Spielman, Spring Valley, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 907 days.

(21) Appl. No.: 11/115,648

(22) Filed: Apr. 27, 2005

Related U.S. Application Data

(60) Provisional application No. 60/566,013, filed on Apr. 28, 2004.

(51) Int. Cl.
*H04J 3/24* (2006.01)
*H04L 12/66* (2006.01)
*H04L 12/28* (2006.01)
*H04L 29/06* (2006.01)

(52) U.S. Cl. ........ 370/349; 370/352; 370/356; 370/389; 370/401; 713/150

(58) Field of Classification Search .......... 370/352–356
See application file for complete search history.

(56) References Cited

U.S. PATENT DOCUMENTS

| | | | | |
|---|---|---|---|---|
| 6,768,896 | B2* | 7/2004 | Tjalldin et al. | 455/11.1 |
| 6,788,667 | B1* | 9/2004 | Beresin | 370/338 |
| 7,103,067 | B1* | 9/2006 | Singh et al. | 370/467 |
| 7,184,538 | B1* | 2/2007 | Doskow et al. | 379/221.1 |
| 7,209,473 | B1* | 4/2007 | Mohaban et al. | 370/352 |
| 7,336,649 | B1* | 2/2008 | Huang | 370/352 |
| 2001/0039623 | A1* | 11/2001 | Ishikawa | 713/201 |
| 2002/0101848 | A1* | 8/2002 | Lee et al. | 370/349 |
| 2002/0163926 | A1* | 11/2002 | Moharram | 370/428 |
| 2002/0172169 | A1* | 11/2002 | Rosen et al. | 370/335 |
| 2002/0181476 | A1* | 12/2002 | Badamo et al. | 370/401 |
| 2003/0120502 | A1* | 6/2003 | Robb et al. | 705/1 |
| 2003/0147369 | A1* | 8/2003 | Singh et al. | 370/338 |
| 2004/0170155 | A1* | 9/2004 | Omar et al. | 370/349 |
| 2004/0184444 | A1* | 9/2004 | Aimoto et al. | 370/352 |

* cited by examiner

*Primary Examiner* — Huy D Vu
*Assistant Examiner* — Brandon Renner

(57) ABSTRACT

The present invention provides for improved security in a VoIP architecture. In accordance with an embodiment of the invention, a system for providing VoIP service to a user domain having user accessible equipment includes a first domain having VoIP service provider equipment and a second domain having at least one border element communicating with the service provider equipment and the user accessible equipment to enable communications between the service provider equipment and the user accessible equipment. The user accessible equipment is prevented from directly communicating with the service provider equipment.

6 Claims, 3 Drawing Sheets

METHOD AND APPARATUS FOR PROVIDING SECURE VOICE/MULTIMEDIA COMMUNICATIONS OVER INTERNET PROTOCOL

This application claims the benefit of U.S. Provisional Application No. 60/566,013 filed Apr. 28, 2004, which is incorporated herein by reference.

BACKGROUND OF THE INVENTION

The present invention relates generally to security, and more particularly to a security architecture for Voice over Internet Protocol (IP) services.

Many businesses and individuals have a broadband connection to the Internet. This broadband connection enables users to stay connected to the Internet as long as the user wants at no added cost. Voice over Internet Protocol (VoIP) is a technology that enables a user to make telephone calls using the same broadband connection as the user uses to connect to the Internet instead of with an analog telephone line. VoIP therefore enables phone calls to be conducted over the same broadband Internet connection, resulting in any number of telephone calls over any distance at no added cost.

A VoIP provider typically designs a system having network equipment providing the VoIP services and equipment such as VoIP telephones that are accessible by customers. Further, the network equipment may set up and monitor the VoIP telephone calls between two pieces of customer premises equipment.

Although conducting telephone calls over the Internet in such an arrangement provides many benefits, the system described above also introduces security concerns. For example, because the customer premises equipment can access and communicate directly with the VoIP service provider equipment, the customer premises equipment, or rogue internet systems not associated with the customer, can potentially access the information stored in the VoIP service provider equipment. Further, the customer premises equipment, or rogue internet systems not associated with the customer, can potentially be used to write over the data stored in the service provider equipment. Moreover, a denial of service attack may be directed toward the service provider equipment. Thus, an attacker may use a VoIP telephone or other piece of equipment to flood one or more pieces of service provider equipment with data/information, potentially affecting the operation of the flooded pieces of equipment.

Further, VoIP customers expect that all data within the VoIP infrastructure remain private and are not subject to eavesdropping and recording. Unfortunately, if service provider equipment establishes a call between two VoIP telephones, another customer could intercept the communications between the two VoIP telephones by accessing the service provider equipment.

Thus, security risks still remain with the typical VoIP architecture, as the customer can use equipment to directly access and communicate with the service provider's equipment.

BRIEF SUMMARY OF THE INVENTION

The present invention provides for security in a VoIP architecture. In accordance with an embodiment of the invention, a system for providing VoIP service to a user domain having user accessible equipment includes a first domain having VoIP service provider equipment and a second domain having at least one border element communicating with the service provider equipment and the user accessible equipment to enable communications between the service provider equipment and the user accessible equipment. The user accessible equipment is prevented from directly communicating with the service provider equipment.

The system for providing VoIP service may include a first piece of user accessible equipment communicating with a first border element and a second piece of user accessible equipment communicating with a second border element. The service provider equipment can include a call control element, a media server, and an application server. The call control element sets up the communications between the first and the second user accessible equipment. The call control element monitors the communications between the first and second user accessible equipment. In one embodiment, media is transferred between the first and second border elements after the call control element sets up the communications. The border element may also recognize abnormal communication(s) from the user accessible equipment.

In one embodiment, the present invention includes a border element for use in providing VoIP service. The border element includes a processor and a memory coupled to the processor. The processor stores instructions adapted to be executed by the processor to receive a first VoIP service request from equipment accessible by at least one customer and to send a second VoIP service request to a network element of a VoIP service provider. Before sending the VoIP request, the border element determines whether the first VoIP service request is abnormal.

In another embodiment, a method for providing VoIP service includes receiving, by a first border element in a first domain, communications from a first user accessible module in a second domain to establish communications with a second user accessible module in the second domain. The method also includes communicating, by the first border element, with service provider equipment in a third domain to set up the communications, and establishing, by the service provider equipment, the communications between the first user accessible module and the second user accessible module by enabling media communication between the first border element and the second border element.

The service provider equipment in the third domain can monitor the communications with the user accessible equipment. The first border element may recognize an abnormal communication transmitted from the first user accessible equipment. Moreover, the second border element may recognize an abnormal communication transmitted from the second user accessible equipment.

The present invention may also include a method for communicating between a first user accessible equipment supporting a first encryption technique and a second user accessible equipment supporting a second encryption technique. The method includes receiving, at a first border element, a VoIP media stream encrypted with a first encryption technique from the first user accessible equipment. The method also includes decrypting, by the first border element, the encrypted media stream and transmitting the decrypted media stream to a second border element. The method also includes encrypting, by the second border element, the decrypted media stream using the second encryption technique and transmitting the encrypted media stream to the second user accessible equipment.

DETAILED DESCRIPTION

Figure 1:
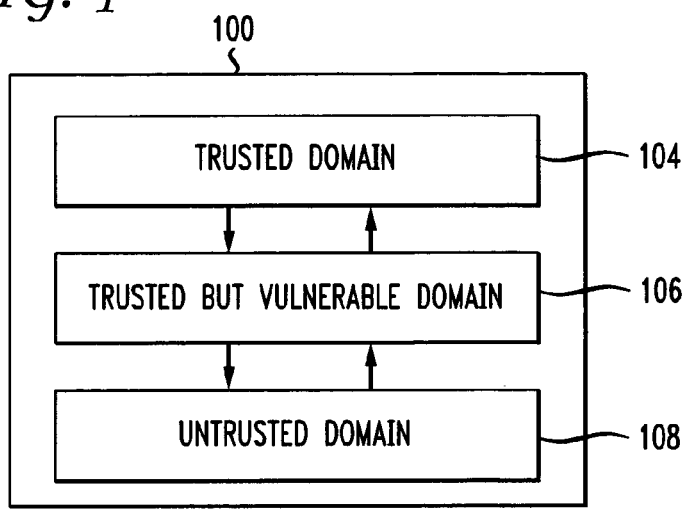
FIG. 1 shows a high level block diagram of a system for providing VoIP service in accordance with an embodiment of the invention.

FIG. 1 shows a high level block diagram of a system 100 for providing VoIP service in accordance with an embodiment of the invention. The system 100 includes three security domains—a trusted domain 104, an untrusted domain 106, and a trusted but vulnerable domain 108.

As described in more detail below, the trusted domain 104 includes VoIP network elements of the VoIP service provider (i.e., "service provider equipment"). The untrusted domain 106 includes all network elements of customer networks or peer networks (i.e., user accessible equipment). The trusted but vulnerable domain 108 includes border elements and enables indirect communications between the network elements in the trusted domain 104 and the network elements in the untrusted domain 106. Thus, the network elements in the untrusted domain 106 do not communicate directly with network elements in the trusted domain 104 but rather via the network elements in the trusted but vulnerable domain 108.

Instead of enabling VoIP communications between user accessible equipment and VoIP service provider equipment, thereby potentially introducing security risks to the service provider equipment, as described above, the system 100 enables indirect communications between the two groups of network elements through the third, trusted but vulnerable domain 108. Thus, the third, trusted but vulnerable domain 108 enables user accessible equipment to communicate with each other via VoIP without having to directly communicate with network elements in the trusted domain 104.

Figure 2:
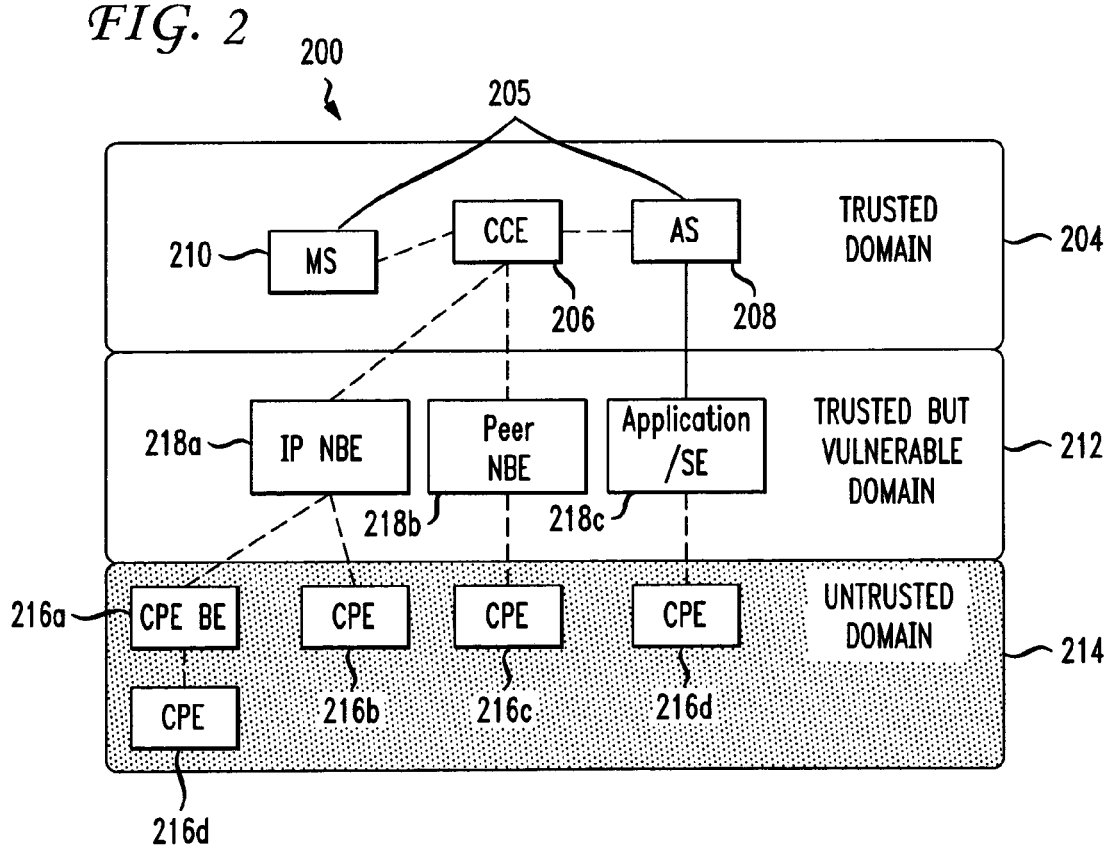
FIG. 2 shows a more detailed block diagram of the system of FIG. 1 having VoIP service provider equipment in accordance with an embodiment of the invention.

FIG. 2 shows a more detailed block diagram of a system 200 having network elements in accordance with an embodiment of the invention. The trusted domain 204 includes one or more service provider equipment 205 to provide the VoIP service. For example, the trusted domain (i.e., the service provider equipment 205) can include the Call Control Element (CCE) 206. The CCE 206 can set up and end calls between user accessible equipment such as VoIP telephones. Each CCE 206 can also transfer, conference, and forward calls. The trusted domain 204 can also include an Application Server (AS) 208. The AS 208 may provide additional applications for VoIP calls, such as three way calling, calling name delivery, remote call forwarding, selective call acceptance, selective call rejection, caller ID block, call waiting, distinctive ringing, etc. The trusted domain 204 can also include a Media Server (MS) 210. The MS 210 can, for example, collect digits, play announcements, and establish interactive voice response(s).

The service provider equipment 205 in the trusted domain 204 are typically owned and operated by the service provider, are located in the service provider premises (thereby providing physical security), and communicate only with network elements in the trusted domain 204 and the trusted but vulnerable domain 212.

The untrusted domain 214 includes user accessible equipment (UAE) (or module) (e.g., UAE 216a, 216b, 216c, 216d, and 216e (generally 216)). UAE 216 may include, for example, Session Initiation Protocol (SIP) telephones, IP-PBXs, Microsoft Windows XP clients executing softphone applications, etc. These UAE 216 are located outside of the service provider premises (i.e., the trusted domain 204) so that there is no guarantee of physical security. Each UAE 216 communicates only with other UAE 216 in the untrusted domain 214 and elements in the trusted but vulnerable domain 212.

The trusted but vulnerable domain 212 includes one or more border elements (BEs) (e.g., 218a, 218b, 218c (generally 218)). The BEs 218 separate the UAE 216 from the rest of the system 200. The BEs 218 also translate various signaling protocols into the SIP protocol used within the system 200. The Application Security Element (SE) 218c separates the user accessible equipment from the customer databases residing in the AS 208. This SE 218c also handles the requests from the AS 208 to databases stored on the customer site, and transfers the response back to the AS 208. The SE 218c knows the normal transactions that occur and protects the service provider equipment 205 (e.g., AS 208) from any abnormal activity.

Thus, the trusted but vulnerable domain 212 separates the service provider equipment (e.g., CCE 206) in the trusted domain 204 from the UAE 216 in the untrusted domain 214. No direct communication is permitted between the UAE 216 and the network elements in the trusted domain 204 (e.g., the CCE 206). Instead, all communications are checked, validated, and filtered by a BE 218. In general, the BEs 218 are aware of the "normal" interactions between the UAE 216 and the trusted domain network elements. Further, the BEs 218 detect and respond to any interactions that are considered "abnormal". Examples of "abnormal" behavior include excessive request volumes, badly formatted requests, excessive packet traffic (e.g., media), or badly formed responses to requests from the common infrastructure. For example, assume that the BE 218 knows that it typically receives 100 packets/second from a G711 IP telephone. If the BE 212 determines that it is not receiving 100 packets/second, then the BE 212 determines that it is receiving abnormal communications (e.g., significantly more than 100 packets/second might indicate a file backup). Once the BE 218 determines that a file backup is occurring, the BE 218 terminates the call. Thus, the BE 218 protects the trusted domain network elements from attack/damage.

The border elements 218 are therefore the main defense against external attacks. In the worst case of abnormal behavior or even an intentional attack, the BE 218 effectively goes out of service and still protects the trusted domain network elements from attack.

The BEs 218 (or any other equipment/module described above and below) may contain a processor which controls the overall operation of the BE 218 (or other equipment/module) by executing computer program instructions which define such operation. The computer program instructions may be stored in a storage device (e.g., magnetic disk) and loaded into memory when execution of the computer program instructions is desired. Thus, the border element operation will be defined by computer program instructions stored in memory and/or storage and the BE 218 will be controlled by a processor executing the computer program instructions. BE 218 may also include one or more network interfaces for communicating with other devices via a network. BE 218 also includes input/output which represents devices which allow for user interaction with the BE 218 (e.g., display, keyboard, mouse, speakers, buttons, etc.). One skilled in the art will recognize that an implementation of an actual BE 218 (or other equipment/module) will contain other components as well.

In one embodiment, the service provider equipment 205 (e.g., AS 208) of the trusted domain 204 are protected by a combination of security measures. For example, the service provider equipment may be hardened and/or assigned a unique certificate for each piece of VoIP service provider equipment 205. Further, the Transport Layer Security (TLS) protocol, defined by the Internet Engineering Task Force (IETF), may be used for signaling messages. TLS is a non-HTTP specific implementation of Secure Socket Layer (SSL). In particular, TLS is a standard, secure method for relatively low volume transport layer encryption. TLS in this context may be used to prevent the signaling part of the data stream from being modified or snooped upon without detection. Specifically, the implementation may include the provisioning of device certificates which may then be used (as part of the TLS specifications) to protect the signaling stream. Since the traffic is then encrypted, snooping is not typically useful for an attacker. Moreover, because certificates are used to establish the connection in the first place, a high degree of assurance can often be provided regarding user accessible equipment.

Further, the Internet Protocol (IP) Security Protocol (IPsec), also defined by the IETF, may also be used. Other security measures may also be employed to protect the service provider equipment in the trusted domain, such as using a Virtual Private Network (VPN). Like TLS, IPsec may be used to secure either the media, signaling, or both data streams. IPsec is a standard set of protocols and standards to protect the signaling from being modified or snooped upon.

The network elements of the trusted but vulnerable domain 212 (i.e., BEs 218) may also be protected by one or more security measures, such as those described above for the trusted domain 204. Moreover, the trusted but vulnerable domain 212 may also include self-contained packet filters and/or host-based firewalls. Additionally, the UAE 216 in the untrusted domain 214 may employ one or more of the security measures described above.

Figure 3:
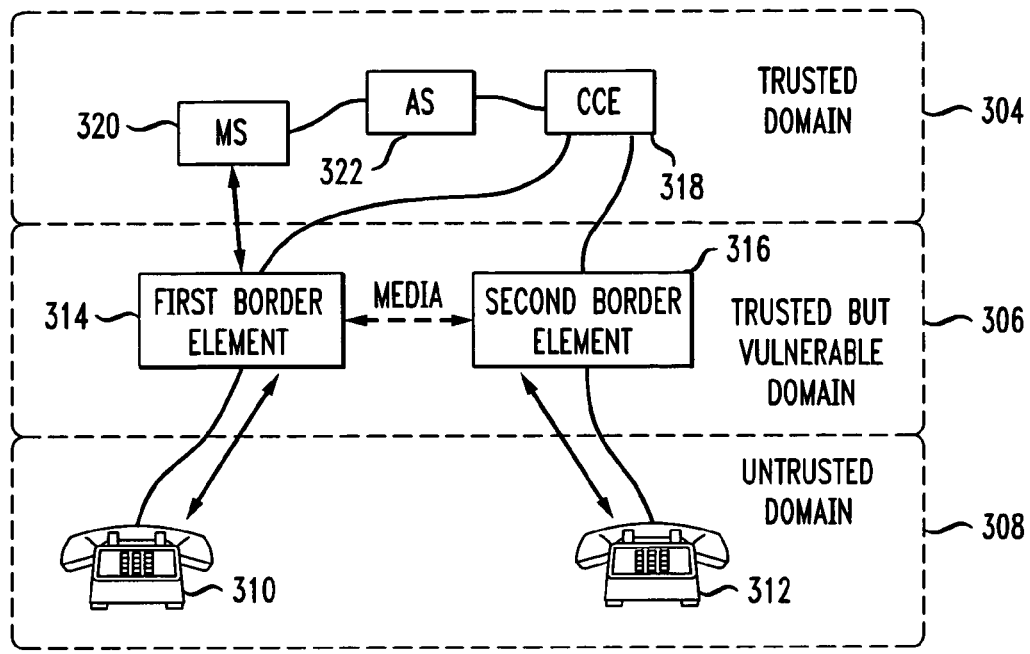
FIG. 3 shows a block diagram of two endpoint elements in the untrusted domain transmitting and receiving media via a first border element and a second border element.

FIG. 3 shows a block diagram of two UAE 310, 312 in the untrusted domain 308 transmitting and receiving media via two border elements in the trusted but vulnerable domain 306. Specifically, the untrusted domain 308 includes a first VoIP telephone 310 and a second VoIP telephone 312. The first VoIP telephone 310 is served by a first border element 314. Thus, media traffic from the first VoIP telephone 310 terminates at the first border element 314. Similarly, the second VoIP telephone 312 is served by a second border element 316 and, consequently, media traffic from the second VoIP telephone 312 terminates at the second border element 316.

In particular, the first VoIP telephone 310 calls the second VoIP telephone 312. The first VoIP telephone 310 communicates with the first BE 314. The first BE 314 communicates with the CCE 318 and the CCE 318 determines what kind of service is needed for the call. The CCE 318 also determines that the second VoIP telephone 312 is the final destination of the call. The CCE 318 transmits a signal to the second VoIP telephone 312 via the second BE 316 indicating that it is the destination of a call from the first VoIP telephone 312. The CCE 318 then sets up the call to the second VoIP telephone 312. Once the CCE 318 completes the signaling, the media is transmitted across the BEs 314, 316. In particular, the first VoIP telephone 310 transmits media to the first border element 314 and the first BE 314 transmits the media to the second VoIP telephone 312.

Further, if special processing is needed, the CCE 318 determines this and communicates with the application server (AS) 322 (and/or MS 320) to provide one or more applications related to the VoIP call. As described above, the AS 322 can provide three way calling, calling name delivery, remote call forwarding, selective call acceptance, selective call rejection, caller ID block, call waiting, distinctive ringing, etc. for the call.

Thus, the BEs 314, 316 enable the two UAEs 310, 312 to communicate over the trusted but vulnerable domain 306. Further, the BEs 314, 316 communicate with the network elements of the trusted domain 304, such as the CCE 318, to set up and monitor the VoIP call. As a result, security is maintained for the components of the trusted domain 304, as the UAEs 310, 312 do not directly communicate with any network element in the trusted domain 304. The BEs 314, 316 instead facilitate indirect communications between the equipment in the untrusted domain 308 and the equipment in the trusted domain 304.

Media encryption may also be desirable in a VoIP architecture. Traditionally, however, media encryption is possible only when both user accessible equipment (e.g., both VoIP telephones) employ the same encryption techniques. If two customers have UAEs that employ different encryption schemes, then the two customers typically cannot communicate using encryption.

Figure 4:
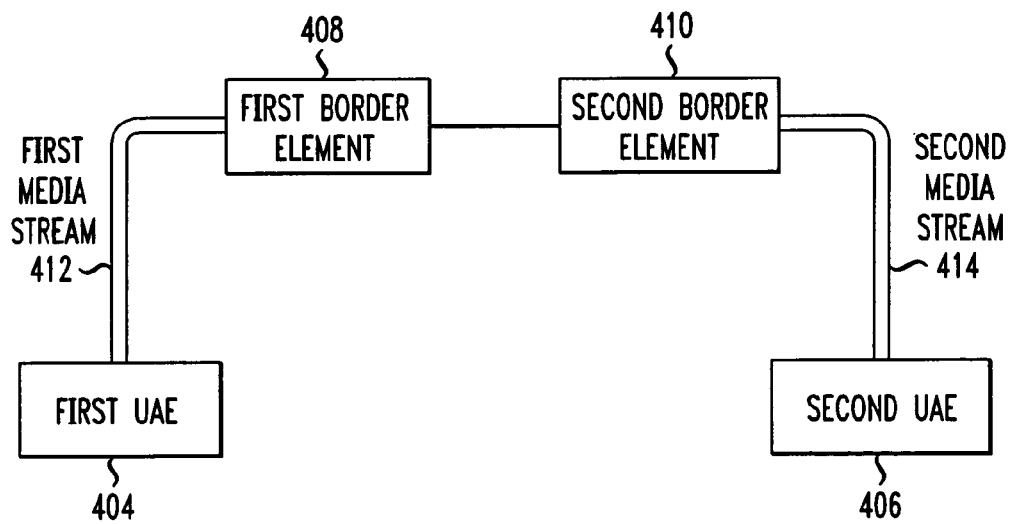
FIG. 4 shows a block diagram of two endpoints communicating via a first border element and a second border element.
Figure 5:
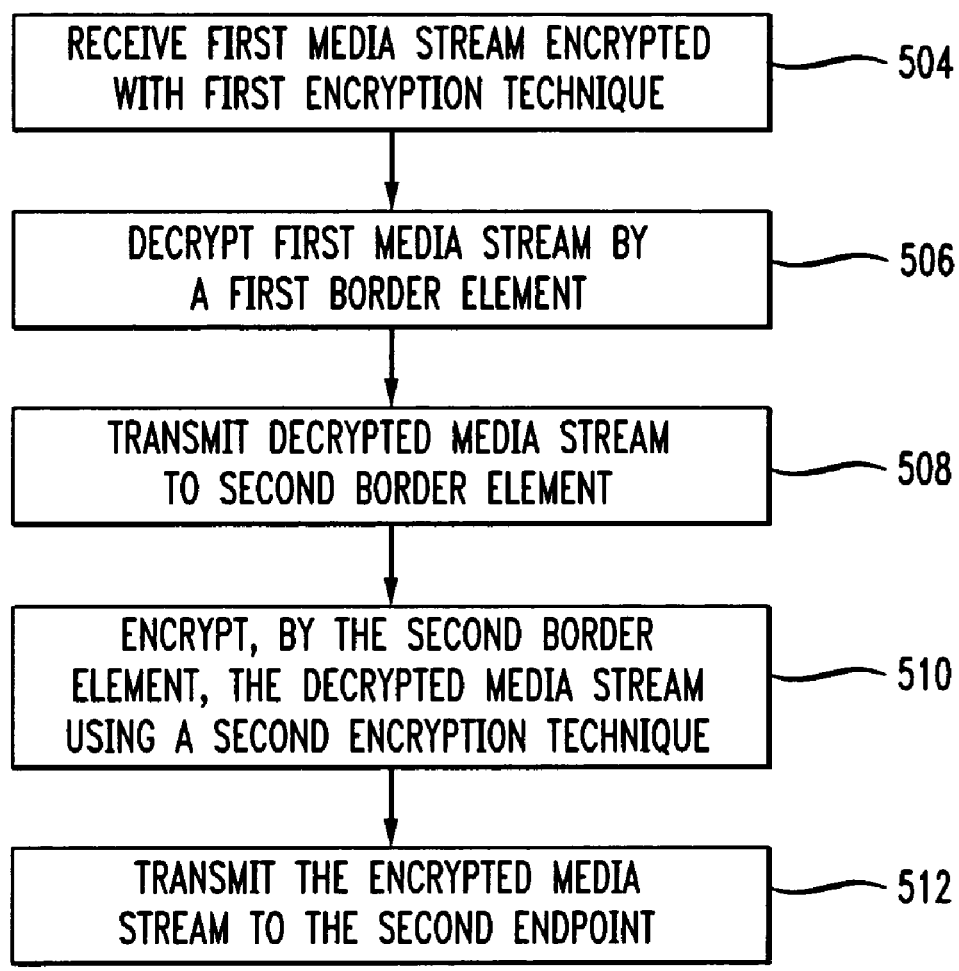
FIG. 5 is a flow chart of the steps performed by the border elements of FIG. 4.

Media encryption may alternatively be supported at the border elements. FIG. 4 shows a block diagram of two UAEs 404, 406 communicating via a first border element 408 and a second border element 410. FIG. 5 is a flow chart of the steps performed by the border elements 408, 410. Each UAE 404, 406 (e.g., VoIP telephones) may support the same type of encryption, different types of encryption, or no encryption.

For example, the first UAE 404 uses a first encryption technique and the second UAE 406 uses a second encryption technique. The first BE 408 receives, as shown in step 504, a first media stream 412 encrypted with a first encryption technique. The first BE 408 decrypts the first media stream in step 506. In step 508, the first BE 408 transmits the decrypted media stream to the second BE 410 and the second BE 410 encrypts the decrypted media stream using the second encryption technique, as shown in step 510. The second BE 410 then transmits the encrypted media stream 414 to the second UAE 406 in step 512.

One example is if the first UAE 404 expects an encrypted media stream but the second UAE 406 does not. The first BE 408 acts as an encryption/decryption relay point. The first BE 408 receives the encrypted stream 412 from the first UAE 404. The first BE 408 decrypts the first media stream 412 and transmits it to the second BE 410. The second BE 410 transmits the media stream to the second UAE 406. In the reverse direction, the second UAE 406 transmits an unencrypted media stream (i.e., the second media stream 414) to the second BE 410 and the second BE 410 transmits the unencrypted media stream to the first BE 408. The first BE 408 encrypts the media stream as the first media stream 412 and transmits the encrypted media stream to the first UAE 404.

Another example is if the second UAE 406 uses encryption but the first UAE 404 does not. The second border element 410 acts as an encryption/decryption relay point. The first BE 408 receives an unencrypted first media stream 412 from the first UAE 404 and transmits it to the second BE 410. The second BE 410 encrypts the media stream and transmits the second media stream 414 to the second endpoint 406. In the reverse direction, the second BE 410 receives an encrypted second media stream 414 and decrypts it before forwarding it to the first BE 408. The first BE 408 transmits the decrypted media stream 412 to the first endpoint 404.

Yet another example is if both the first and second endpoints 404, 406 use encryption but they do not support compatible encryption techniques or there is some enhanced service being provided by the BEs 408, 410 (such as DTMF detection for calling card applications). Both BEs 408, 410 act as encryption/decryption relay points. The first BE 404 receives the encrypted stream from the first endpoint 404, decrypts it, and transmits it to the second BE 410. The second BE 410 encrypts the stream and transmits it to the second endpoint 406. In the reverse direction, the second BE 410 receives the encrypted media stream from the second endpoint 406 and decrypts it before sending it to the first BE 408. The first BE 408 receives the unencrypted media stream and encrypts it before transmitting it to the first endpoint 404. Thus, the media streams between the endpoints and BEs are encrypted but are not encrypted between the two BEs.

Another example is if the first endpoint 404 and the second endpoint 406 both expect encrypted media, support compatible encryption schemes, and there is no enhanced service being provided by the BEs 408, 410. In this case, the media between the endpoints and BEs and between the two BEs are encrypted.

The BEs 408, 410 therefore support no encryption by one or both endpoints 404, 406, different encryption techniques by the endpoints 404, 406, or the same encryption techniques by both endpoints 404, 406.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A system for providing voice over internet protocol service to a user domain comprising user accessible equipment, the system comprising:
    a first domain comprising voice over internet protocol service provider equipment configured to support a signaling protocol comprising at least a session initiation protocol signaling protocol;
    a second domain comprising at least one border element communicating with the service provider equipment and the user accessible equipment to enable communications between the voice over internet protocol service provider equipment and the user accessible equipment, each of the at least one border element configured to translate at least one non-session-initiation protocol signaling protocol to the session initiation protocol signaling protocol;
    wherein the user accessible equipment is prevented from directly communicating with the service provider equipment;
    wherein the at least one border element is configured to:
        monitor first requests received from the user accessible equipment;
        determine whether a volume of the first requests is normal or excessive;
        transmit the first requests to the first domain when the volume of the first requests is normal; and
        terminate transmission of the first requests to the first domain when the volume of the first requests is excessive; and
    wherein the at least one border element is configured to:
        handle transactions between an application server in the first domain to a database stored in the user domain, the transactions comprising:
            receiving second requests from the application server;
            transmitting the second requests received to the database;
            receiving responses from the database; and
            transmitting the responses received to the application server;
        determine whether a transaction is normal or abnormal;
        complete the transaction when the transaction is normal; and
        terminate the transaction when the transaction is abnormal.

2. The system of claim 1 wherein a first of the user accessible equipment communicates with a first border element and a second of the user accessible equipment communicates with a second border element.

3. The system of claim 2 wherein the voice over internet protocol service provider equipment further comprises at least one of:
    a call control element configured to support at least the session initiation protocol signaling protocol;
    a media server configured to perform at least one of:
        collecting at least one digit;
        playing at least one announcement; and
        establishing at least one interactive voice response; and
    an application server configured to provide at least one of:
        three-way calling;
        calling name delivery;
        remote call forwarding;
        selective call acceptance;
        selective call rejection;
        caller ID block;
        call waiting; and
        distinctive ringing.

4. The system of claim 3 wherein the call control element sets up the communications between the first and the second of the user accessible equipment.

5. The system of claim 4 wherein the call control element monitors the communications.

6. The system of claim 4 wherein the communications between the first and the second of the user accessible equipment occurs via media transferred between the first border element and the second border element.

* * * * *